No. 867,668. PATENTED OCT. 8, 1907.
J. L. MILLER.
MOTOR AND OTHER CYCLE.
APPLICATION FILED JUNE 12, 1907.
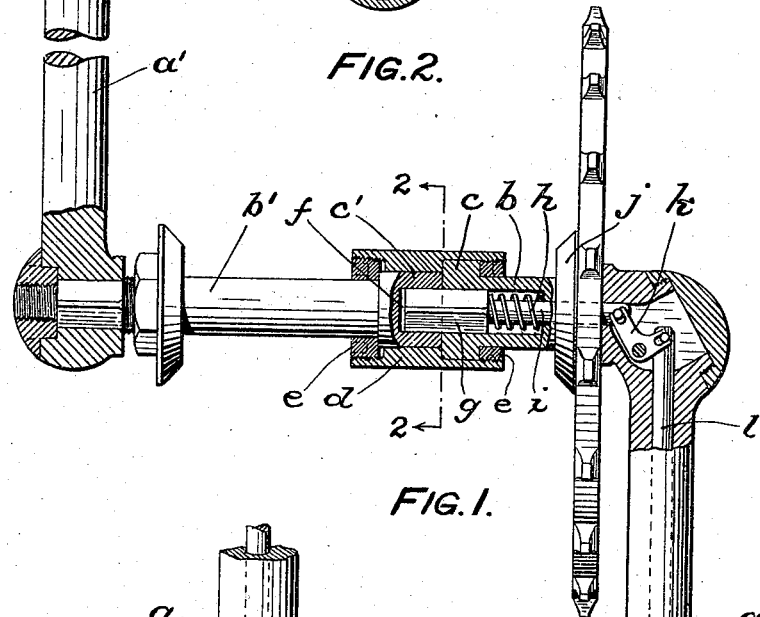
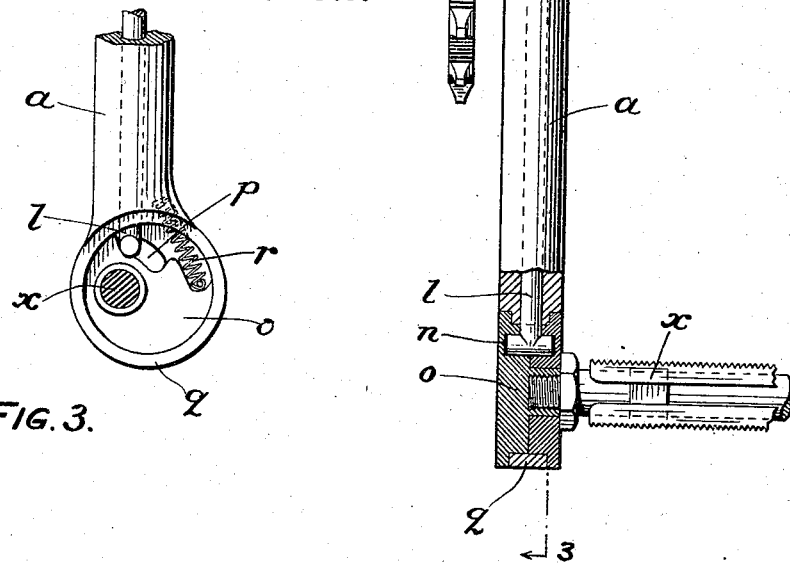
WITNESSES:
INVENTOR
John L. Miller
BY
ATTORNEYS.

UNITED STATES PATENT OFFICE.

JOHN L. MILLER, OF PAULSBORO, NEW JERSEY.

MOTOR AND OTHER CYCLE.

No. 867,668.  Specification of Letters Patent.  Patented Oct. 8, 1907.

Application filed June 12, 1907. Serial No. 378,517.

*To all whom it may concern:*

Be it known that I, JOHN L. MILLER, a citizen of the United States, residing at Paulsboro, county of Gloucester, and State of New Jersey, have invented a new and useful Improvement in Motor and other Cycles, of which the following is a full, clear, and exact description, reference being had to the accompanying drawings, which form a part of this specification.

In motor and other cycles, as ordinarily constructed, the pedals and cranks, whether in use to propel or not, always occupy a position at an angle to each other. This, when the pedals are not in use to propel, necessitates the rider maintaining one leg in an uncomfortable position, one of the pedals being high when the other is low.

My invention has for its object to obviate this difficulty and to provide means whereby, when the pedals are not in use to propel, both pedals may be brought to the same level, the low level. Speaking generally, I accomplish this by forming the pedal crank shaft in two sections and providing a device which normally connects said parts, but which, through intermediate mechanism, is thrown out of action when one of the pedals is moved backward or back-pedaled.

I will first describe the embodiment of my invention as illustrated in the accompanying drawings and then point out the invention in the claims.

In the drawings: Figure 1 is an elevation of a bicycle crank shaft and cranks partly broken away. Fig. 2 is a section of crank shaft on line 2—2. Fig. 3 is an elevation of pedal hub on line 3 with one of the eccentrics removed.

$a$ $a'$ are the two pedal cranks.

$x$ $x'$ are the pedals; $b$ $b'$ respectively the shaft sections for the cranks $a$ $a'$.

$c$ is a flange or projection at end of shaft section $b$, and $c'$ is a flange or projection at end of shaft section $b'$.

$d$ is a sleeve held in position by nuts $e$.

The two shaft connections are normally held together in the following manner. The shaft section $b'$ has a rectangular orifice or socket $f$. The shaft section $b$ has the clutch device consisting of the rectangular bolt $g$ normally held in engagement in slot or orifice $f$, by the spring $h$, so that the two sections normally revolve together. The spring $h$ surrounds the rod $i$ which passes through the cone bearing $j$ and is connected to one member of a bell crank lever $k$, the other end of which is connected to rod $l$ which extends downward through crank $a$ and, at its lower end, rests in a detent $n$ in the eccentric $o$. This detent forms the mouth of the cam slot $p$ in the eccentric $o$.

$q$ is a strap surrounding the eccentric $o$ and to which the crank $a$ is connected. The other end of the crank $a$ is connected to shaft section $b$. When the pedal $x$ is moved in the direction to propel the cycle, the eccentric, strap and crank revolve with the axis of crank section $b$ and the spring $h$ holds the shaft sections $b$ and $b'$ together. When, say with a motor cycle, the cycle is being propelled by the motor, if the operator back-pedals upon the pedal $x$, the cam slot $p$ will allow the eccentric $o$ to move independent of the strap $q$ and operate the rod $l$ to move the bolt $g$ from engagement with orifice or detent $f$, compressing spring $h$, severing the connection of shaft sections $b$ and $b'$ and allowing both pedals to be brought to the same level, the low point. A spring $r$, connecting the eccentric $o$ and strap $q$, is, during this movement, brought under tension so that, when the operator releases the pedal $x$ from the last mentioned position, this spring will return the eccentric to its initial position, the rod $l$ will move upward and the spring $h$ will return the bolt $g$ into engagement with detent $f$. When I speak of back-pedaling or moving backward of the pedal or movement of the pedal, I mean either actual or relative movement. Thus the result may be obtained either by actually moving the pedal $x$ backward or by holding it from forward movement while the other pedal $x'$ is being moved forward and thus produce a relative movement backward of pedal $x$.

Having now fully described my invention, what I claim and desire to protect by Letters Patent is:

1. In a cycle, in combination, cranks and pedals, a shaft section for each crank normally connected and means adapted, when one of the pedals is moved backward, to sever said connection.

2. In a cycle, in combination, cranks and pedals, a shaft connection for each crank normally connected and means adapted, when one of the pedals is moved backward, to sever said connection and means to return said connection in the return movement of said pedal.

3. In a cycle, in combination, two cranks and pedals, a shaft section for each crank and means, in the backward movement of one of the pedals, to sever the connection between said shaft sections.

4. In a cycle, in combination, two cranks and pedals, a shaft section for each crank and means, in the backward movement of one of the pedals, to sever the connection between said shaft section and to connect said shaft section in the return movement of said pedal.

5. In a cycle, in combination, two cranks and pedals, a shaft section for each crank, means to maintain connection between said shaft sections, in the forward movement of the pedals and means, in the backward movement of one of the pedals, to sever said connection.

6. In a cycle, in combination, two cranks and pedals, a shaft section for each crank, means to maintain connection between said shaft sections, in the forward movement of the pedals, means, in the backward movement of one of the pedals, to sever said connection, and means, in the return movement of said last mentioned pedal, to return said connection.

7. In a cycle, in combination, two cranks and pedals, a shaft section for each crank, a clutch device adapted to normally connect said shaft sections and connection between said clutch device and one of said pedals adapted, in the movement of the pedal in one direction, to release said clutch.

8. In a cycle, in combination, two cranks and pedals, a shaft section for each crank, a clutch device for engaging said sections, a rod, connection between said rod and said clutch, said rod moving with said crank, an eccentric having a cam slot in which the end of said rod rests, and a strap surrounding said eccentric to which said crank is connected—the pedal being connected to said eccentric—whereby, in the movement of said eccentric in one direction, said rod is operated and the clutch disengaged.

9. In a cycle, in combination, two cranks, and pedals, a shaft section for each crank, a clutch device for engaging said sections, a rod, connection between said rod and said clutch, said rod moving with said crank, an eccentric having a cam slot in which the end of said rod rests, and a strap surrounding said eccentric to which said crank is connected—the pedal being connected to said eccentric—whereby, in the movement of said eccentric in one direction, said rod is operated and the clutch disengaged, and a spring for bringing said clutch into engagement in the opposite movement of the pedal.

10. In a cycle, in combination, two cranks and pedals, a shaft section for each crank, a clutch device for engaging said sections, a rod, connection between said rod and said clutch, said rod moving with said crank, an eccentric having a cam slot in which the end of said rod rests, and a strap surrounding said eccentric to which said crank is connected—the pedal being connected to said eccentric—whereby, in the movement of said eccentric in one direction, said rod is operated and the clutch disengaged, and a spring for returning said eccentric and returning said rod when the pedal is released.

11. In a cycle, in combination, two cranks and pedals, a shaft section for each crank, a clutch device for engaging said sections, a rod, connection between said rod and said clutch, said rod moving with said crank, an eccentric having a cam slot in which the end of said rod rests, and a strap surrounding said eccentric to which said crank is connected—the pedal being connected to said eccentric—whereby, in the movement of said eccentric in one direction, said rod is operated and the clutch disengaged, and a spring for returning said eccentric and returning said rod when the pedal is released, and a spring for bringing said clutch into engagement on the return of said rod.

In testimony of which invention, I have hereunto set my hand, at Philadelphia, on this 31st day of May, 1907.

JOHN L. MILLER.

Witnesses:
M. M. HAMILTON,
A. M. URIAN.